United States Patent [19]
Walker

[11] 3,910,935
[45] Oct. 7, 1975

[54] CARBAMOYL SULFOXIDE DERIVATIVES

[75] Inventor: Francis Harry Walker, Mill Valley, Calif.

[73] Assignee: Stauffer Chemical Company, Westport, Conn.

[22] Filed: Aug. 24, 1973

[21] Appl. No.: 391,386

Related U.S. Application Data

[63] Continuation of Ser. No. 280,383, Aug. 14, 1972, abandoned.

[52] U.S. Cl. ............................. 260/294.8 E; 71/94
[51] Int. Cl.² ........................................ C07D 213/52
[58] Field of Search ................................ 260/294.8

*Primary Examiner*—Harry I. Moatz
*Attorney, Agent, or Firm*—Daniel C. Block

[57] ABSTRACT

Intermediate compounds useful for manufacturing herbicidal active sulfoxide compounds are described herein. The compounds have the following generic formula:

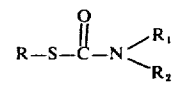

wherein R is selected from pyridylalkyl, $R_1$ and $R_2$ can be the same or different and can be selected from the group consisting of lower alkyl, cycloalkyl, alkenyl and benzyl.

2 Claims, No Drawings

CARBAMOYL SULFOXIDE DERIVATIVES

This is a continuation, of application Ser. No. 280,383, filed Aug. 14, 1972, now abandoned.

DESCRIPTION OF THE INVENTION

This invention is directed to a novel group of compounds which may be generally described as sulfoxide derivatives of thiocarbamates which are highly active herbicides. These compounds are represented by the generic formula:

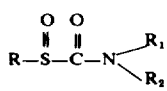

wherein R can be selected from the group consisting of pyridylalkyl, $R_1$ and $R_2$ can be the same or different and can be selected from the group consisting of lower alkyl, cycloalkyl, alkenyl and benzyl.

The above-noted compounds can be prepared by reacting an oxidizing agent such as peracetic acid or m-chloroperoxybenzoic acid with a thiocarbamate compound corresponding to the following formula:

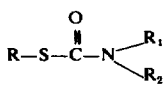

wherein R, $R_1$ and $R_2$ have been defined above. The reaction is carried out in the presence of a solvent such as chloroform, methylene chloride, benzene or toluene, and at a reduced temperature of from about −25°C. to about 15°C. The amount of oxidizing agent used must be at least one molar equivalent to form the sulfoxide derivative.

The thiocarbamate compounds are known herbicides and their method of synthesis is known; see U.S. Pat. Nos. 2,913,327, 2,983,747, 3,133,947, 3,175,897 and 3,185,720 for example. However, the use of these thiocarbamates as reactive intermediates to form other compounds that also have pesticidal activity is unexpected.

In order to illustrate the merits of the present invention the following examples are provided:

EXAMPLE 1

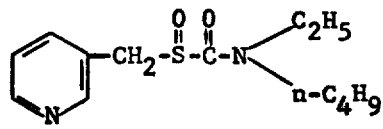

A solution was formed containing 6.0 g. (0.024 mole) S-(3-pyridylmethyl)-N-ethyl-N-butylthiocarbamate dissolved in 100 cc. of methylene chloride. This solution was cooled to −15°C. in a dry ice bath. Then, 4.5 g. (0.026 mole) of m-chloroperoxybenzoic acid was added portionwise over a period of 1.5 minutes. The mixture was stirred for 1 hour and the temperature was raised to 5°C. and held for 0.5 hours. Then, the mixture was warmed to room temperature. The reaction mixture was transferred to a separatory funnel and treated 4 times with 50 ml. of a 5% sodium carbonate solution followed by 2 – 50 ml. water washes. After drying over $MgSO_4$, the solvent was removed by vacuum to yield 5.0 g. of product, $n_D^{30}$ - 1.5471.

Other compounds were prepared in an analogous manner starting with the appropriate starting materials as outlined above. The following is a table of compounds representative of those embodied by the present invention. Compound numbers have been assigned to them and are used for identification throughout the balance of the specification.

TABLE I

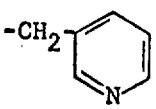

| Compound Number | R | $R_1$ | $R_2$ |
|---|---|---|---|
| 1 | 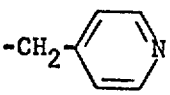 -CH$_2$-(3-pyridyl) | —$C_2H_5$ | n—$C_4H_9$ |
| 2 | -CH$_2$-(4-pyridyl) | —$C_2H_5$ | n—$C_4H_9$ |
| 3 | 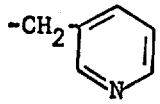 -CH$_2$-(3-pyridyl) | —$CH_2$—CH=$CH_2$ | —$CH_2$—CH=$CH_2$ |
| 4 | 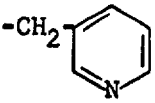 -CH$_2$-(3-pyridyl) | n—$C_3H_7$ | n—$C_3H_7$ |

TABLE I-Continued $$R-S-C(=O)-N(R_1)(R_2)$$
(with two C=O... actually: R—S—C(=O)—N with R1, R2; shown as R—S—C—N with two =O on S)

| Compound Number | R | $R_1$ | $R_2$ |
|---|---|---|---|
| 5 | " | $-C_2H_5$ | ⟨S⟩ (thiophene) |
| 6 | $-CH_2-$⟨pyridyl⟩ | " | " |
| 7 | " | $n-C_3H_7$ | $n-C_3H_7$ |
| 8 | | | $-C_2H_5$ |

HERBICIDAL SCREENING TESTS

As previously mentioned, the novel compounds herein described are phytotoxic compounds which are useful and valuable in controlling various plants species. Compounds of this invention are tested as herbicides in the following manner.

A. Preemergence Herbicide Screening Test: Using an analytical balance, 20 mg of the compound to be tested is weighed out on a piece of glassine weighing paper. The paper and compound are placed in a 30 ml widemouth bottle and 3 ml of acetone containing 1% Tween 20 is added to dissolve the compound. If the material is not soluble in acetone, another solvent such as water, alcohol or dimethylformamide (DMF) is used instead. When DMF is used, only 0.5 ml or less is used to dissolve the compound and then another solvent is used to make the volume up to 3 ml. The 3 ml of solution is sprayed uniformly on the soil contained in a small Styrofoam flat one day after planting weed seeds in the flat of soil. A No. 152 DeVilbiss atomizer is used to apply the spray using compressed air at a pressure of 5 lb/sq.in. The rate of application is 8 lb/acre and the spray volume is 143 gal/acre.

On the day preceding treatment, the Styrofoam flat which is 7 inches long, 5 inches wide and 2.75 inches deep is filled to a depth of 2 inches with loamy sand soil. Seeds of seven different weed species are planted in individual rows using one species per row across the width of the flat. The seeds are covered with soil so that they are planted at a depth of 0.5 inch. The seeds used are hairy crabgrass (*Digitaria sanguinalis*), yellow foxtail (*Setaria glauca*), watergrass (*Echinochloa crusgalli*), red oat (*Avena sativa*), redroot pigweed (*Amaranthus retroflexus*), Indian mustard (*Brassica juncea*) and curly dock (*Rumex crispus*). Ample seeds are planted to give about 20 to 50 seedlings per row after emergence depending on the size of the plants.

After treatment, the flats are placed in the greenhouse at a temperature of 70° to 85°F and watered by sprinkling. Two weeks after treatment the degree of injury or control is determined by comparison with untreated check plants of the same age. The injury rating from 0 to 100% is recorded for each species as percent control with 0% representing no injury and 100% representing complete kill.

B. Postemergence Herbicide Screening Test: Seeds of six plant species, including hairy crabgrass, watergrass, red oat, mustard, curly dock and Pinto beans (*Phaseolus vulgaris*) are planted in the Styrofoan flats as described above for preemergence screening. The flats are placed in the greenhouse at 70° to 85°F and watered daily with a sprinkler. About 10 to 14 days after planting when the primary leaves of the bean plants are almost fully expanded and the first trifoliate leaves are just starting to form, the plants are sprayed. The spray is prepared by weighing out 20 mg of the test compound, dissolving it in 5 ml of acetone containing 1% Tween 20 and then adding 5 ml of water. The solution is sprayed on the foliage using a No. 152 DeVilbiss atomizer at an air pressure of 5 lb/sq.in. The spray concentration is 0.2% and the rate is 8 lb/acre. The spray volume is 476 gal/acre.

Injury ratings are recorded 14 days after treatment. The rating system is the same as described above for the preemergence test.

The results of these tests are shown in Table II.

TABLE II

HERBICIDAL ACTIVITY - SCREENING RESULTS

| Compound Number | Percent Control* at 8 lb/A | |
|---|---|---|
| | Preemergence | Postemergence |
| 1 | 63 | 27 |
| 2 | 39 | 22 |
| 3 | 20 | 3 |
| 4 | 92 | 75 |
| 5 | 27 | 40 |
| 6 | 49 | 20 |
| 7 | 30 | 10 |
| 8 | 7 | 15 |

*Average for seven species in the preemergence test and for six species in the postemergence test.

The compounds of the present invention can be used in any convenient form. Thus, the compounds can be made into emulsifiable liquids, emulsifiable concentrates, liquid, wettable powder, powders, granular or any other convenient form, and applied to the soil to control the undesired vegetation.

The terms lower alkyl and alkenyl are meant to include those compounds having straight or branched chain configurations having from 1 to 6 carbon atoms, inclusive.

What is claimed is:

1. A process of manufacturing a pesticidal active compound having the following formula:

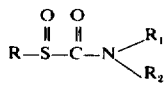

wherein R is pyridylmethyl, $R_1$ and $R_2$ can be the same or different and are selected from the group consisting of lower alkyl cyclohexyl, allyl and benzyl, comprising the steps of a. combining an oxidizing agent selected from the group consisting of peracetic acid and m-chloroperoxybenzoic acid and a thiocarbamate compound in a solvent system; said thiocarbamate having the following formula:

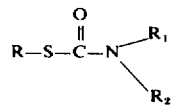

wherein R, $R_1$ and $R_2$ have been defined above;

b. maintaining the temperature between −25°C. and 15°C.

c. said oxidizing agent being present in an amount of at least one molar equivalent.

2. The process of claim 1 wherein the oxidizing agent is and m-chloroperoxybenzoic acid.

* * * * *

UNITED STATES PATENT OFFICE
CERTIFICATE OF CORRECTION

PATENT NO. : 3,910,935
DATED : October 7, 1975
INVENTOR(S) : Francis Harry Walker It is certified that error appears in the above-identified patent and that said Letters Patent are hereby corrected as shown below:

Column 3, Table I, the entry for Compound No. 8 under the heading "R" should read

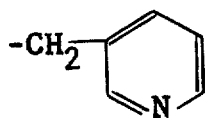

and the entry under the heading "$R_1$" should read

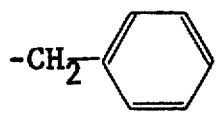

Signed and Sealed this

Eighth Day of March 1977

[SEAL]

Attest:

RUTH C. MASON
Attesting Officer

C. MARSHALL DANN
Commissioner of Patents and Trademarks